United States Patent

Hara

[11] Patent Number: 6,141,498
[45] Date of Patent: Oct. 31, 2000

[54] SHAKE CORRECTOR FOR USE IN AN OPTICAL APPARATUS, A PHOTOGRAPHING APPARATUS PROVIDED WITH A SHAKE CORRECTOR, AND A SHAKE CORRECTING METHOD

[75] Inventor: Yoshihiro Hara, Kishiwada, Japan

[73] Assignee: Minolta Co., Ltd., Osaka, Japan

[21] Appl. No.: 09/094,453

[22] Filed: Jun. 10, 1998

[30] Foreign Application Priority Data

Jun. 11, 1997 [JP] Japan .................................. 9-154009

[51] Int. Cl.[7] .................................................. G03B 17/00
[52] U.S. Cl. ........................................................ 396/55
[58] Field of Search .................................. 396/52, 53, 54, 396/55; 348/208

[56] References Cited

U.S. PATENT DOCUMENTS 5,861,915   1/1999   Sato et al. ................................. 396/55

FOREIGN PATENT DOCUMENTS 07306432   11/1995   Japan .
08051566   2/1996    Japan .
08240831   9/1996    Japan .

Primary Examiner—W. B. Perkey
Attorney, Agent, or Firm—McDermott, Will & Emery

[57] ABSTRACT

A shake corrector for use in an optical apparatus provided with a correction lens, includes a temperature detector for detecting an ambient temperature, and a controller for controlling driving of the correction lens to correct a shake of an optical axis of an optical apparatus with respect to an object. The controller generates a control signal of controlling the driving of the correction lens based on a detected temperature. This shake corrector performs a stable correcting operation in spite of variations in the ambient temperature.

23 Claims, 7 Drawing Sheets

SHAKE CORRECTOR FOR USE IN AN OPTICAL APPARATUS, A PHOTOGRAPHING APPARATUS PROVIDED WITH A SHAKE CORRECTOR, AND A SHAKE CORRECTING METHOD

This application is based on patent application Ser. No. 9-154009 filed in Japan, the contents of which is hereby incorporated by reference.

BACKGROUND OF THE INVENTION

This invention relates to a shake corrector for use in an optical apparatus, a photographing apparatus provided with a shake corrector, and a shake correcting method.

In recent years, there has been proposed a camera having a function of detecting a shake amount of a camera main body with respect to an object resulting from a shake of a hand by using a CCD (Charge Coupled Device) or the like and correcting this shake amount to cancel it, for example, in Japanese Unexamined Patent Publication No. 8-51566. Further, video cameras, electronic still cameras having a similar function have been commercially available.

The cameral disclosed in Japanese Unexamined Patent Publication No. 8-51566 includes a correction optical system provided along an optical axis of a taking lens and a CCD area sensor for detecting a shake amount. The shake amount of the camera main body with respect to an object is calculated based on a variation of a light receiving position of an object image sensed by a CCD area sensor, and a drive amount by which the correction optical system is to be driven is calculated based on this shake amount. Further, a target position is calculated based on the calculated shake amount in view of a predicted shake, and the correction optical system is controllably driven to the target position in accordance with the predicted shake. On the other hand, a displacement of the target position caused by a variation of an ambient temperature of the camera main body is corrected according to the ambient temperature.

Japanese Unexamined Patent Publication No. 7-306432 discloses a camera which is capable of detecting an ambient temperature and changing a frequency characteristic (filter characteristic) of a servo circuit in order to correct a natural frequency of a feedback loop system which varies according to the ambient temperature.

In the camera disclosed in the Japanese Unexamined Patent Publication No. 8-51566, the correction optical system needs to be controllably moved until the target position is reached while properly following the hand shake. However, the driving performance of a moving mechanism for moving the correction optical system, such as gears, and a motor for providing a driving force to the moving mechanism change according to variations in the ambient temperature. In other words, these members have temperature characteristic. Accordingly, unless the movement of the correction optical system is controlled in consideration of the temperature characteristic of these members, the shake cannot properly be corrected.

SUMMARY OF THE INVENTION

It is an object of the present invention to provide a shake corrector for use in an optical apparatus, a photographing apparatus provided with a shake corrector, and a shake correcting method which have overcome the problems residing in the prior art.

According to an aspect of the present invention, a shake corrector for use in an optical apparatus provided with a correction lens, comprises: a temperature detector which detects an ambient temperature; and a controller which controls driving of the correction lens to correct a shake of an optical axis of the optical apparatus with respect to an object, the controller including a control signal generator which generates a control signal of controlling the driving of the correction lens based on a detected temperature.

According to another aspect of the present invention, a photographing apparatus comprises: a taking lens which introduces light from an object to a photosensitive image medium; a correction lens which is movable in specified directions; a shake detector which detects a shake of an optical axis of the taking lens with respect to the object; a basic gain setter which sets a basic gain based on a target position of the correction lens to correct a detected shake and an instant position of the correction lens; a temperature detector which detects an ambient temperature of the photographing apparatus; a correction gain setter which sets a correction gain to correct a set basic gain based on a detected temperature; and a drive controller which controls the drive of the correction lens in accordance with a corrected basic gain.

According to another aspect of the present invention, a method for correcting a shake of an optical apparatus using a correction lens, comprises the steps of: detecting a shake of an optical axis of an optical apparatus with respect to an object; detecting a temperature of an ambient temperature of the optical apparatus; setting a basic gain based on a target position of a correction lens to correct a detected shake and an instant position of the correction lens; setting a correction gain to correct a set basic gain based on a detected temperature; and driving the correction lens in accordance with a corrected basic gain.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
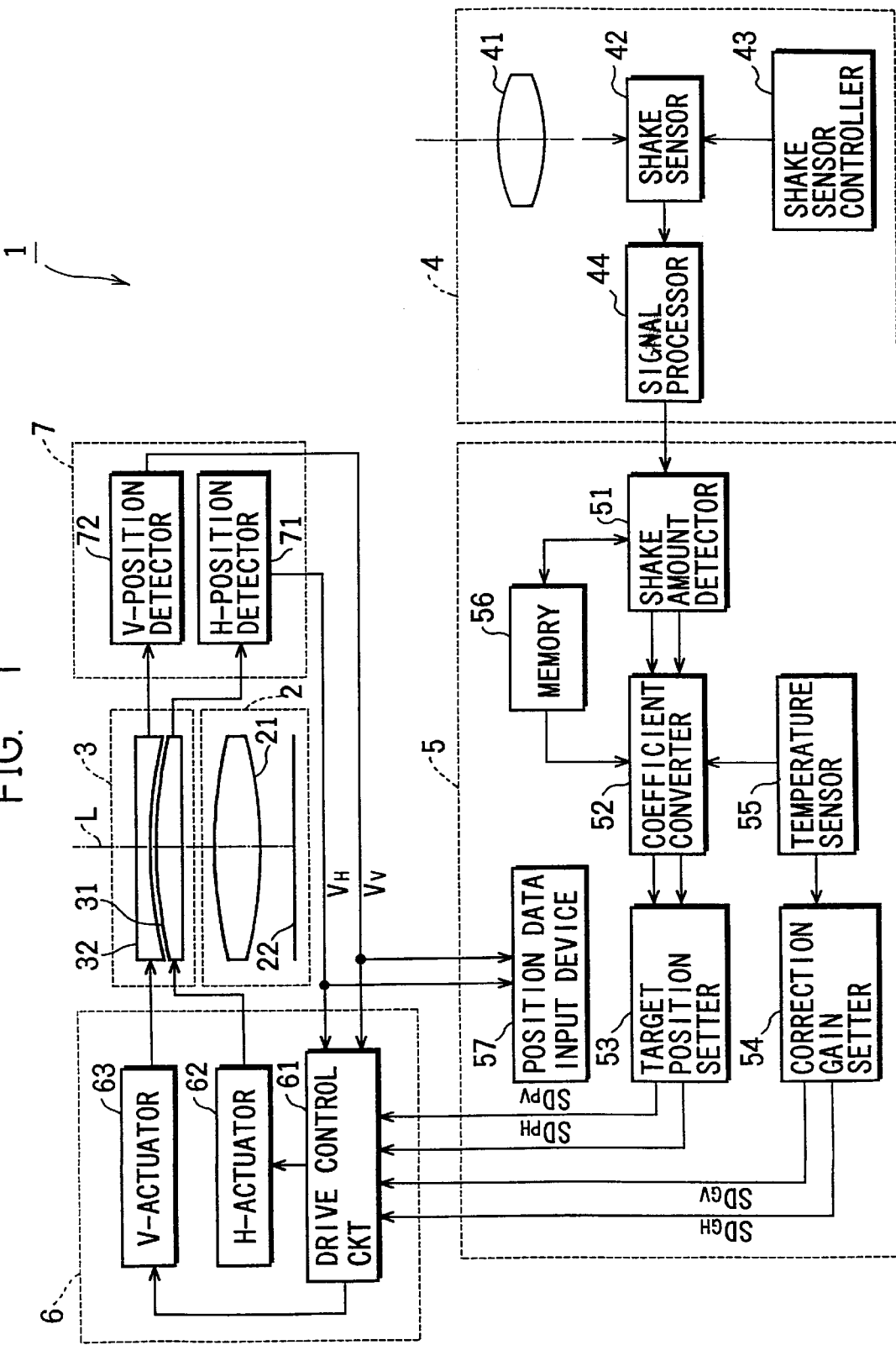
FIG. 1 is a block diagram showing a construction of a camera embodying the invention.
Figure 2:
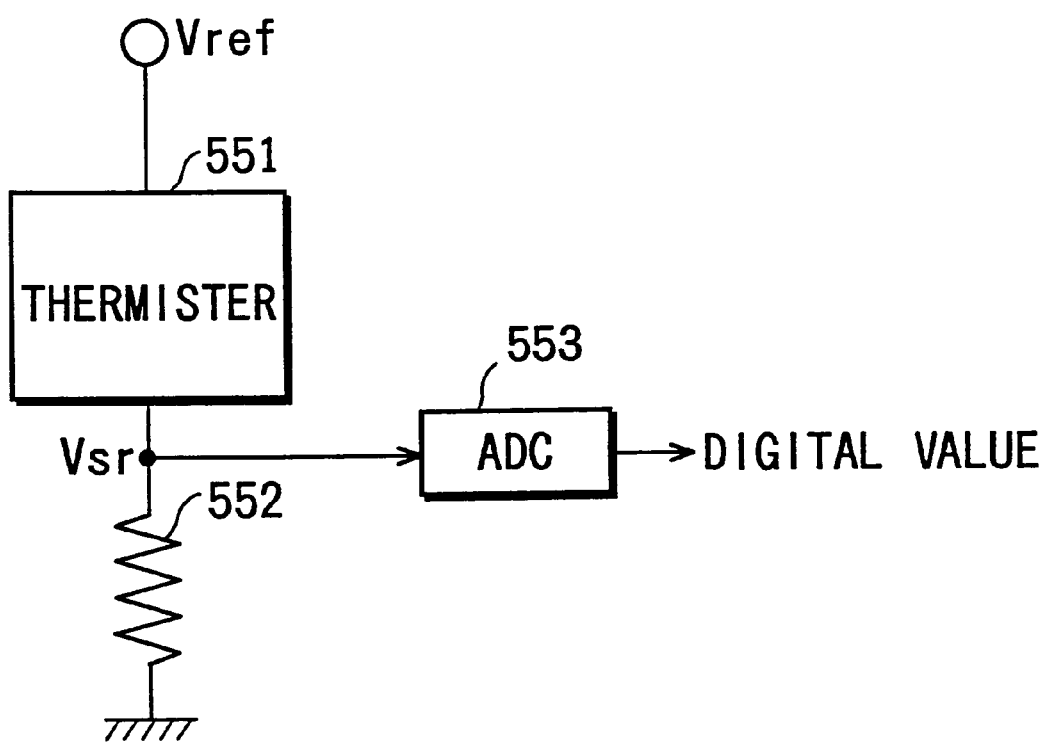
FIG. 2 is a block diagram showing a construction of a temperature sensor used in the camera.

FIG. 1 is a block diagram showing a construction of a camera embodying the invention. A camera 1 includes a picture taking unit 2, a correction lens unit 3, a shake detector 4, a shake correction amount setting unit 5, a driving unit 6 and a position detector 7.

The picture taking unit 2 includes a taking lens 21 having an optical axis L and a mechanism for feeding a loaded film 22 to a focusing position on the optical axis L, and is adapted to photograph an object image.

The correction lens unit 3 includes horizontal and vertical shake correction lenses 31, 32 provided before the taking lens 21 and is adapted to correct a shake of the object image by a prism method. The horizontal and vertical correction lenses 31, 32 have optical axes parallel to the optical axis L, respectively and are so supported as to be movable on a plane normal to the optical axis L in horizontal and vertical directions which are normal to each other. The movements of these lenses 31, 32 are described when the driving unit 6 is described.

The shake detector 4 includes a detection lens 41, a shake sensor 42, a shake sensor controller 43 and a signal processor 44, and is adapted to obtain an image data used to detect a shake of the object image caused by the shake of the main body of the camera 1 with respect to the object.

The detection lens 41 has an optical axis parallel to the optical axis L of the taking lens 21 and focuses the object image on the shake sensor 42 provided therebehind. The shake sensor 42 is an area sensor in which a multitude of photoelectric conversion elements such as CCD are arrayed in a two-dimensional manner and is adapted to sense the object image focused by the detection lens 41 and to generate an electrical signal corresponding to an amount of received light. The image signal of the object image is obtained as a planar collection of pixel signals which are electrical signals obtained by the respective photoelectric conversion elements by receiving the light.

The shake sensor controller 43 causes the shake sensor 42 to cyclically sense the object image and to send the respective pixel signals obtained during this sensing operation to the signal processor 44. The signal processor 44 applies specified signal processings (signal amplification, offset adjustment, etc.) to the respective pixel signals sent from the shake sensor 42, and converts the analog pixel signals into digital pixel data.

The shake correction amount setting unit 5 includes a shake amount detector 51, a coefficient converter 52, a target position setter 53, a correction gain (amplification ratio) setter 54, a temperature sensor 55, a memory 56 and a position data input device 57, and is adapted to set data for generating a drive signal to the driving unit 6.

The temperature sensor 55 includes a series circuit of a thermistor 551 and a resistor 552 and an analog-to-digital (A/D) converter (ADC) 553 which is connected with the series circuit in its intermediate position to convert a detected voltage $V_{sr}$ into a digital value, and is adapted to detect an ambient temperature of the camera 1 as a digital value of the voltage $V_{sr}$.

The memory 56 includes a RAM for temporarily storing data such as an image data and a shake amount data used in the shake amount detector 51, a ROM for storing a conversion coefficient used in the coefficient converter 52, and the like.

The shake amount detector 51 obtains a shake amount of the camera from a reference with respect to the object in pixel number. Here, how the shake amount is obtained is described. First, the respective lenses of the correction lens unit 3 are set in specified reference positions, e.g., in positions where the respective lenses are movable an equal distance in opposite directions (centering). An image data during this centering is obtained as a reference image from the shake detector 4 and stored in the memory 56. Subsequently, the respective image data from the shake detector 4 are traced using an image data matching with the reference image as a target image. The shake amount is obtained from a distance of the position of the target image being traced from the position of the reference image. The shake amount is obtained in horizontal and vertical directions. It should be noted that the shake amount can be obtained in more accurate unit than the pixel number by executing an interpolation according to a known method.

The shake amount detector 51 calculates the speed and acceleration rate of the shake from the obtained shake amount and further calculates a predicted shake amount from the speed and acceleration rate of the shake and the latest shake amount.

The coefficient converter 52 converts values of the predicted shake amounts in horizontal and vertical directions into values of a target angular position in horizontal and vertical directions for the correction lens unit 3 using a conversion coefficient. This converter 52 also calculates a correction coefficient based on the ambient temperature detected by the temperature sensor 55 and corrects the values of the target angular positions in horizontal and vertical directions using this correction coefficient. This correction coefficient is used to correct variations in the focal length of the detection lens 41 caused by a change of the ambient temperature and the refractive index by the correction lens unit 3.

The target position setter 53 converts the values of the target angular position in horizontal and vertical directions for the correction lens unit 3 which are obtained from the coefficient converter 52 into numerical data, thereby obtaining target positions of the horizontal shake correction lens 31 and the vertical shake correction lens 32 (drive end positions). These target positions in horizontal and vertical directions are set in the driving unit 6 as set data SDPH, SDPV.

The correction gain setter 54 calculates gain correction amounts in horizontal and vertical directions based on the ambient temperature detected by the temperature sensor 55, and set them in the driving unit 6 as set data SDGH, SDGV. The gain correction amounts in horizontal and vertical directions are adapted to correct basic gains in horizontal and vertical directions in the driving unit 6. The basic gains and the set data SDGH, SDGV are described in detail later.

The position data input device 57 obtains the positions of the horizontal and vertical shake correction lenses 31, 32 by A/D converting the respective output signals of the position detector 7 and monitoring the obtained output data. By monitoring the values of the position data, an abnormality in the mechanism for driving the correction lens unit 3 can be made detectable.

The driving unit 6 includes a drive control circuit 61, a horizontal actuator 62, and a vertical actuator 63. The drive control circuit 61 generates horizontal and vertical direction drive signals based on the set data SDPH, SDPV, SDGH, SDGV from the target position setter 53 and the correction gain setter 54. The horizontal and vertical actuators 62, 63 each include a coreless motor or the like and drive the horizontal and vertical shake correction lenses 31, 32 in accordance with the horizontal and vertical direction drive signals generated by the drive control circuit 61.

Figure 3:
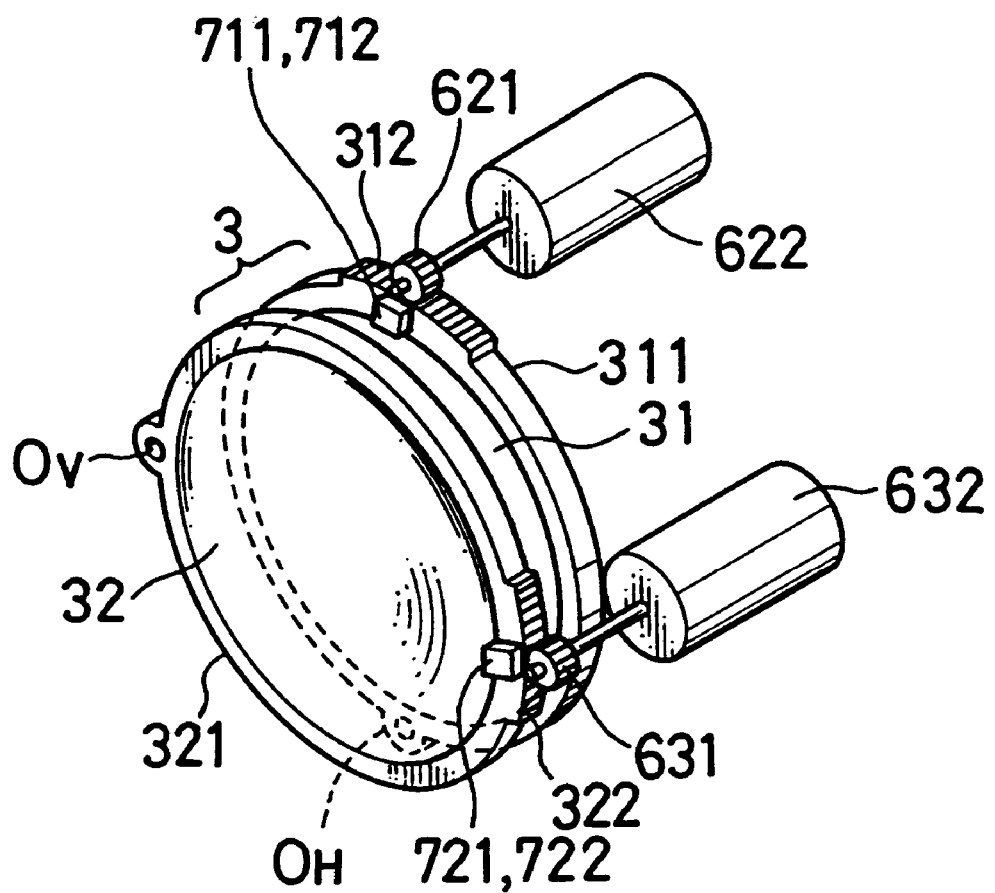
FIG. 3 is a perspective view showing a construction of a moving system used in the camera.

FIG. 3 is a perspective view showing a construction of a moving system for moving the correction lens unit 3. The horizontal shake correction lens 31 is supported on a frame 311 and is rotatable about an axis OH. At a peripheral portion opposite from the axis OH is formed a gear portion 312. The vertical shake correction lens 32 is supported on a frame 321 and is rotatable about an axis OV. At a peripheral portion opposite from the axis OV is formed a gear portion 322.

The horizontal actuator 62 includes a motor (coreless motor) 622 having a gear 621 meshable with the gear portion 312 mounted thereon. Similarly, the vertical actuator 63 includes a motor (coreless motor) 632 having a gear 631 meshable with the gear portion 322 mounted thereon.

Accordingly, the horizontal shake correction lens 31 is moved substantially along horizontal direction by being driven by the motor 622, whereas the vertical shake correction lens 32 is moved substantially along vertical direction by being driven by the motor 632.

Figure 4:
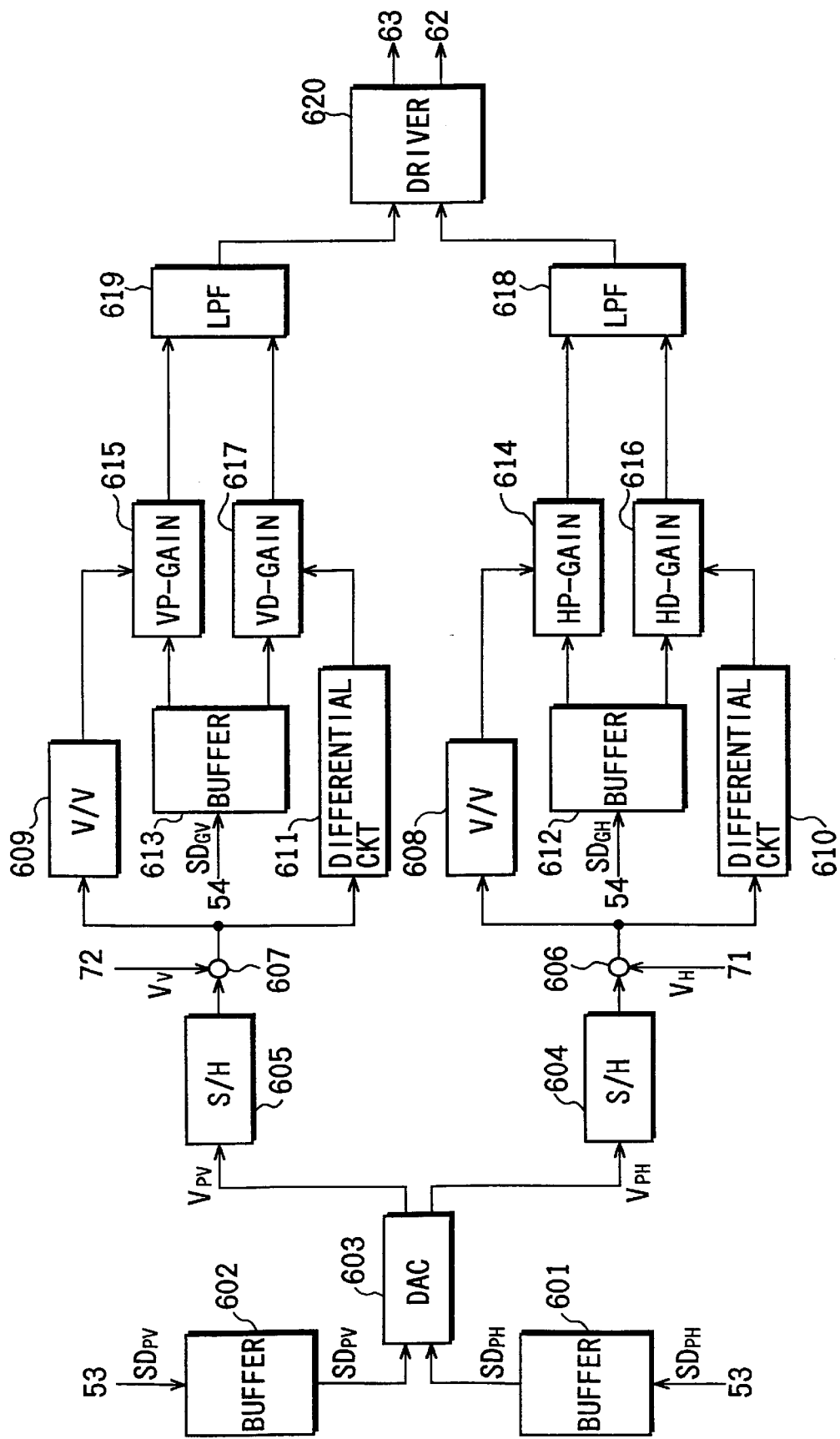
FIG. 4 is a block diagram showing a construction of a drive controller used in the camera.

FIG. 4 is a block diagram showing a construction of the drive control circuit 61 constituting a part of a servo circuit. First, the data SDGH, SDGV set in the drive control circuit 61 are described. In the camera 1, a variation occurs in the moving performance of the moving system for shake correction when the ambient temperature changes. For example, as the ambient temperature changes, the torque ratios of the motors 622, 632 shown in FIG. 3, the backlash of the moving system for the correction lens unit 3 and the driving unit 6, and the hardness of the gears (gear portions 312, 322 and the gears 621, 631) of the moving system change.

Figure 5:
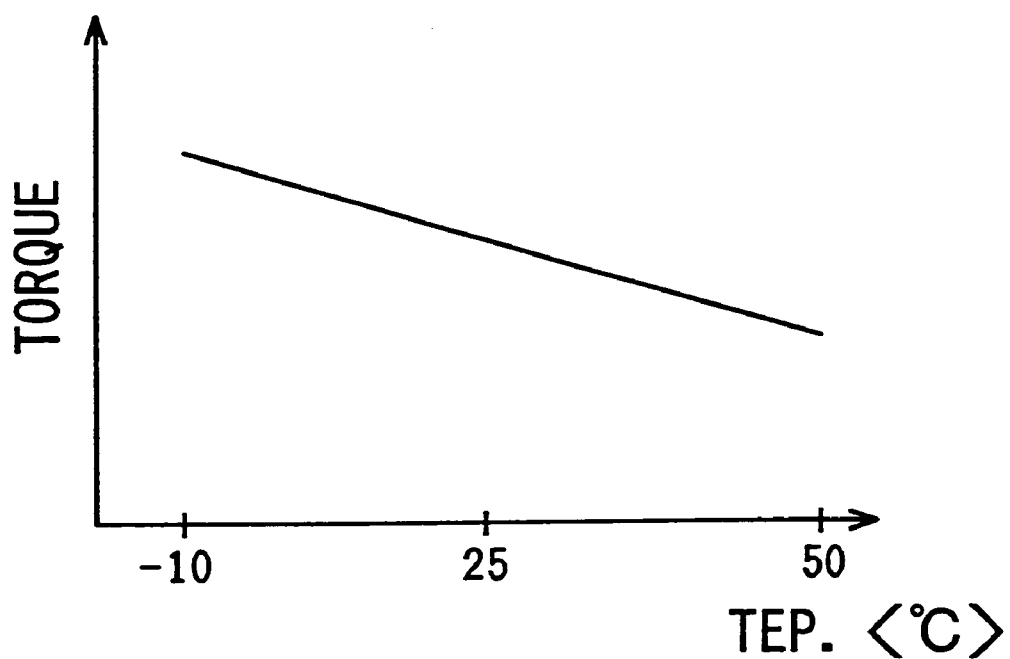
FIG. 5 is a graph showing a temperature characteristic of a motor torque which is a factor of variation in the moving performance.

FIG. 5 is a graph showing a change in the driving performance (torque) of a motor according to a temperature variation. As can be understood from FIG. 5, when the ambient temperature becomes different from a reference temperature (e.g., 25° C.), the motor torque takes a value different from a value at the reference temperature. As a result, the driving performance of the moving system changes. In other words, the driving performance by the horizontal and vertical direction basic gains (drive gains at the reference temperature) changes when the ambient temperature detected by the temperature sensor 55 is different from the reference temperature.

Accordingly, the correction gain setter 54 is so constructed as to generate gain correction amounts for correcting the variations in the driving performances by the respective horizontal and vertical direction basic gains based on the ambient temperature detected by the temperature sensor 55. In this embodiment, functions (ambient temperature as a factor) for obtaining the gain correction amounts for individually correcting the respective variations of the motor torque, backlash and gears caused by the ambient temperature getting different from the reference temperature are obtained with respect to horizontal and vertical directions. The ambient temperatures detected by the temperature sensor 55 are inputted for the respective correction functions with respect to horizontal and vertical directions, and a sum of the obtained values is obtained as a gain correction amount. The gain correction amounts in horizontal and vertical directions are set in the drive control circuit 61 as the set data SDGH, SDGV.

Next, the drive control circuit 61 is described. Although the set data SDGH, SDGV are shown to be transmitted via two signal lines in FIG. 1 to simplify the drawing, they are actually set by serial transmission via unillustrated two data lines (SCK, SD) and three control lines (CS, DA/GAIN, X/Y). Similarly, the set data SDPH, SDPV are alternately transmitted to the drive control circuit 61.

Thus, the drive control circuit 61 includes buffers, sample-and-hold circuits, etc. In other words, buffers 601, 602 are memories for storing the data SDPH, SDPV alternately set by the target position setter 53.

A digital-to-analog converter (DAC) 603 converts the data SDPH set in the buffer 601 and the set data SDPV set in the buffer 602 into a target position voltage VPH.

A sample-and-hold (S/H) circuit 604 samples the target position voltage VPH converted by the DAC 603 and holds this value till a next sampling. Likewise, a S/H circuit 605 samples the target position voltage VPH converted by the DAC 603 and holds this value till a next sampling.

An adding circuit 606 calculates a difference between the target position voltage VPH and an output voltage VH of the horizontal position detector 71. An adding circuit 607 calculates a difference between the target position voltage VPH and an output voltage VV of the vertical position detector 72. In other words, the adding circuits 606, 607 obtain voltage differences by addition since the output voltages VH, VV are obtained as negative voltages in the horizontal and vertical position detectors 71, 72.

Identified by V/V 608 is an amplifier for amplifying an input voltage to a voltage as a horizontal direction proportional gain at a ratio set in advance for the reference temperature. Identified by V/V 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adding circuit 606 by a differential by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adding circuit 607 by a differential by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the set data SDGH of the correction gain setter 54. The set data SDGH is gain correction amounts (proportional and differential gain correction amounts) for correcting the horizontal direction basic gain (proportional and differential gains) A buffer 613 is a memory for storing the set data SDGV of the correction gain setter 54. The set data SDGV is gain correction amounts (proportional and differential gain correction amounts) for correcting the vertical direction basic gain (proportional and differential gains).

A HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

A HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises included in the respective output voltages of the HP and HD gain correcting circuits 614, 616. A low pass filter (LPF) 619 removes high frequency noises included in the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detector 7 shown in FIG. 1 includes the horizontal and vertical position detectors 71, 72, which are adapted to detect the present positions of the horizontal and vertical shake correction lenses 31, 32, respectively.

Figure 6:
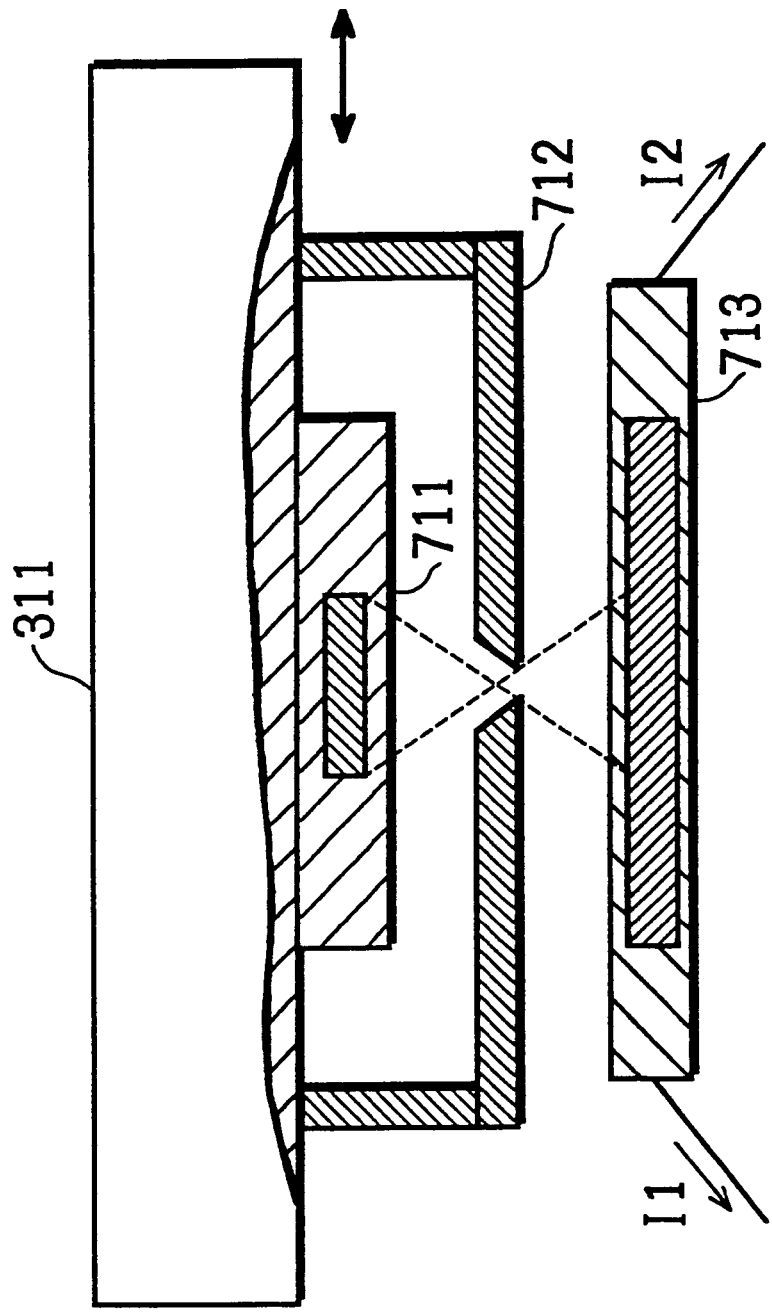
FIG. 6 is a schematic diagram of a horizontal position detector used in the camera.

FIG. 6 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 31.

Figure 7:
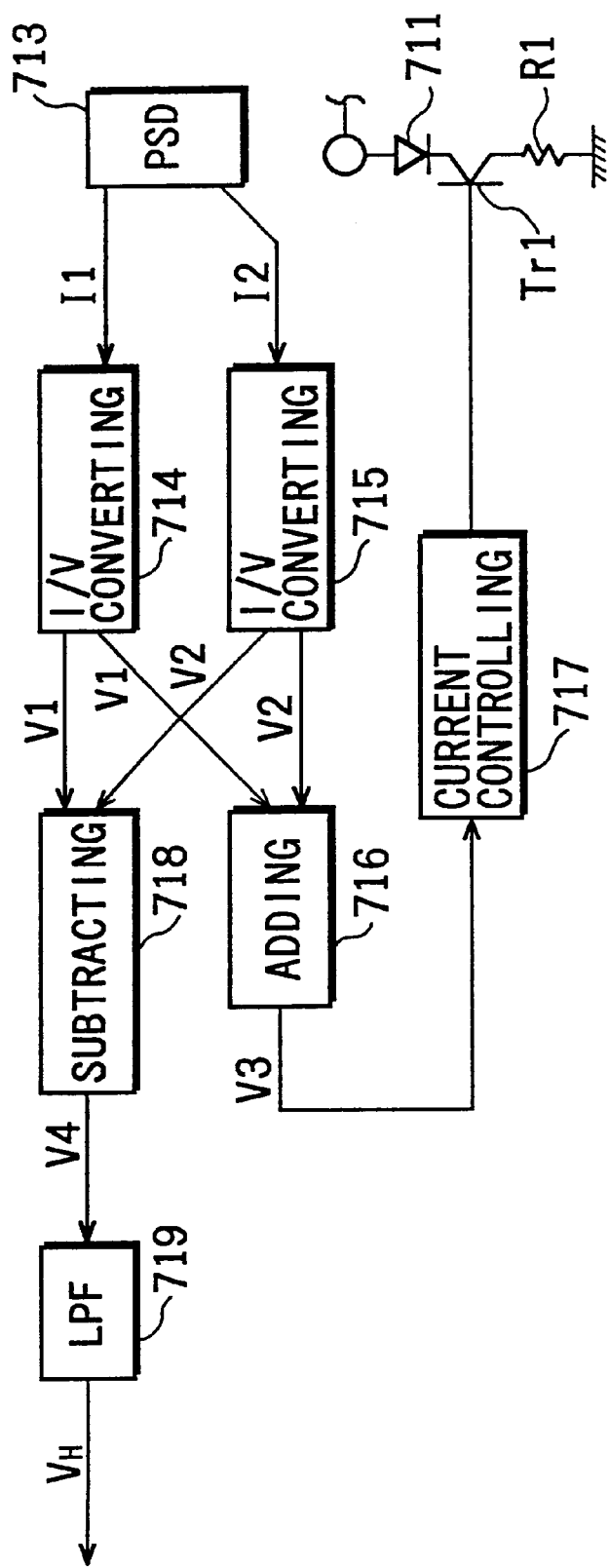
FIG. 7 is a block diagram showing a construction of the horizontal position detector.

FIG. 7 is a block diagram of the horizontal position detector 71. In addition to the LED 711 and the PSD 713, the horizontal position detector 71 includes current-to-voltage (I/V) converting circuits 714, 715, an adding circuit 716, a current controlling circuit 717, a subtracting circuit 718, a low pass filter (LPF) 719, and the like. The I/V converting circuits 714, 715 converts the output currents I1, I2 of the PSD 713 into voltages V1, V2. The adding circuit 716 calculates a sum voltage V3 of the output voltages V1, V2 of the I/V converting circuits 714, 715. The current controlling circuit 717 increases and decreases a base current to a transistor TR1 so as to hold the output voltage V3 of the adding circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components included in the output voltage V4 of the subtracting circuit 718.

Next, the detection by the horizontal position detector is described. The currents I1, I2 from the PSD 713 are converted into the voltages V1, V2 in the I/V converting circuits 714, 715, respectively.

Subsequently, the voltages V1, V2 are added in the adding circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity position) is away to the right from the center of the PSD 713 by a length x, the length x, the currents I1, I2 and a length L of a light sensing area of the PSD 713 satisfy a relationship defined by Equation (1).

$$\frac{I2-I1}{I2+I1} = \frac{2 \cdot x}{L} \qquad (1)$$

Similarly, the length x, the voltages V1, V2 and the length L of the light sensing area satisfy a relationship defined by Equation (2).

$$\frac{V2-V1}{V2+V1} = \frac{2 \cdot x}{L} \qquad (2)$$

If a control is performed so as to make a value of V1+V2, i.e., a value of the voltage V3 always constant, there can be obtained a relationship defined by Equation (3), in which a value of V2−V1, i.e., a value of the voltage V4 represents the length x. Accordingly, the position of the horizontal shake correction lens 31 can be detected if the voltage V4 is monitored.

$$V2-V1 \propto x \qquad (3)$$

Next, the shake correction of the camera 1 is described. The light from the object having passed the detection lens 41 shown in FIG. 1 is incident on the sensing surface of the shake sensor 41 and sensed. An image signal obtained by this sensing is transferred to a signal processor 44 and is converted into an image data after specified signal processings are applied thereto.

The respective image data sent from the signal processor 44 are transferred to the shake amount detector 51, where the shake amounts in horizontal and vertical directions are obtained in pixel number. Specifically, the respective lens of the correction lens unit 3 are centered, and an image data obtained during this centering is read from the shake detector 4 as a reference image and stored in the memory 56. Subsequently, among the respective image data from the shake detector 4, images corresponding with the reference image are traced as a target image, and a shake amount is obtained based on a varying distance of the position of the target image being traced from the position of the reference image. These shake amounts in horizontal and vertical directions are used for the calculation of the predicted shake amounts in horizontal and vertical directions. In other words, a speed and an acceleration rate of the shake are calculated based on the shake amounts with respect to horizontal and vertical directions. The predicted shake amounts are calculated based on the speed and acceleration of the shake and the latest shake amount.

The predicted shake amounts in horizontal and vertical directions are sent to the coefficient converter 52 and are converted into target angular positions in horizontal and vertical directions by corresponding conversion coefficients stored in the memory 56. Subsequently, the correction coefficient is calculated in accordance with the ambient temperature detected by the temperature sensor 55, and the respective target angular positions in horizontal and vertical directions are corrected by the corresponding correction coefficients.

The corrected target angular positions in horizontal and vertical directions are sent to the target position setter 53, in which these angular positions are converted into numerical data and the target positions in horizontal and vertical directions are calculated. The target positions in horizontal and vertical directions are set in the drive control circuit 61 as the set data $SD_{PH}$, $SD_{PV}$.

Simultaneously with the setting of the data $SD_{PH}$, $SD_{PV}$, the correction gain setter 54 inputs the temperature data detected by the temperature sensor 55 into the respective correction functions for horizontal direction, and a sum of the obtained values is obtained as a horizontal direction gain correction amount. Similarly, the correction gain setter 54 inputs the temperature data detected by the temperature sensor 55 into the respective correction functions for vertical direction, and a sum of the obtained values is obtained as a vertical direction gain correction amount. The horizontal and vertical direction gain correction amounts are set in the drive control circuit 61 as the set data $SD_{GH}$, $SD_{GV}$.

If the data $SD_{PH}$, $SD_{PV}$, $SD_{GH}$, $SD_{GV}$ are set in the drive control circuit 61 shown in FIG. 4, the horizontal and vertical direction drive signals are generated. In other words, the set data $SD_{PH}$, $SD_{PV}$ from the target position setter 53 are stored in the buffers 601, 602, respectively.

Upon the transfer of the set data $SD_{PH}$ to the buffer 601, the set data $SD_{PH}$ is converted into a target position voltage $V_{PH}$ by the DAC 603. Upon the transfer of the set data $SD_{PV}$ to the buffer 602 the set data $SD_{PV}$ is converted into a target position voltage $V_{PV}$ by the DAC 603.

The target position voltage $V_{PH}$ is sampled by the sample-and-hold circuit 604 and is added to the output voltage $V_H$ of the horizontal position detector 71 in the adding circuit 606. A voltage corresponding to a difference between the target position of the horizontal shake correction lens 31 and the detected position can be obtained. Similarly, the target position voltage $V_{PV}$ is sampled by the sample-and-hold circuit 605 and is added to the output voltage $V_V$ of the vertical position detector 72 in the adding circuit 607. A voltage corresponding to a difference between the target position of the vertical shake correction lens 32 and the detected position can be obtained.

Subsequently, the output voltage of the adding circuit 606 is amplified at the ratio set in advance for the reference temperature by the amplifier 608. Similarly, the output voltage of the adding circuit 607 is amplified at the ratio set in advance for the reference temperature by the amplifier 609.

On the other hand, the output voltage of the adding circuit 606 is converted into a voltage corresponding to a speed difference in horizontal direction by the differential circuit 610. Similarly, the output voltage of the adding circuit 607 is converted into a voltage corresponding to a speed difference in vertical direction by the differential circuit 611.

The set data $SD_{GH}$, $SD_{GV}$ from the correction gain setter 54 are stored in the buffers 612, 613, respectively. In other words, the horizontal direction gain correction amounts (proportional and differential gain correction amounts) are stored in the buffer 612 and the vertical direction gain correction amounts (proportional and differential gain correction amounts) are stored in the buffer 613.

The output voltage of the amplifier 608 is corrected by the HP gain correcting circuit 614 by adding an analog voltage corresponding to the horizontal direction proportional gain correction amount from the buffer 612. Similarly, the output voltage of the amplifier 609 is corrected by the VP gain correcting circuit 615 by adding an analog voltage corresponding to the vertical direction proportional gain correction amount from the buffer 613. In this way, the output voltages of the amplifiers 608, 609 are corrected in accordance with the ambient temperature detected by the temperature sensor 55.

The output voltage of the differential circuit 610 is corrected by the HD gain correcting circuit 616 by adding an analog voltage corresponding to the horizontal direction differential gain correction amount from the buffer 612. Similarly, the output voltage of the differential circuit 611 is corrected by the VD gain correcting circuit 617 by adding an analog voltage corresponding to the vertical direction differential gain correction amount from the buffer 613. In this way, the output voltages of the differential circuits 610, 611 are corrected in accordance with the ambient temperature detected by the temperature sensor 55.

The output signals of the HP and HD gain correcting circuits 614, 616 have high frequency noises removed by the LPF 618, and are sent to the horizontal actuator 62 after the application of voltage amplification by the driver 620. Similarly, the output signals of the VP and VD gain correcting circuits 615, 617 have high frequency noises removed by the LPF 619 and are sent to the vertical actuator 63 after the application of voltage amplification by the driver 620.

The horizontal and vertical actuators 62, 63 shown in FIG. 1 drive the horizontal and vertical correction lenses 31, 32 in accordance with the horizontal and vertical direction drive signals generated by the drive control circuit 61.

In the manner as described above, the light coming from the object is refracted so as to suppress the degree of the object image shake caused by a camera shake or the like in accordance with a relative positional relationship of the driven horizontal and vertical shake correction lenses 31, 32.

In this embodiment, the gain correction amount is used when the ambient temperature is different from the reference temperature. However, a gain according to the ambient temperature may merely be used. In other words, the gain correction amount is calculated using a plurality of correction functions obtained in advance in this embodiment. However, for example, a gain correction amount obtained in advance for each ambient temperature may be stored in a memory and a gain correction amount corresponding to the ambient temperature detected by the temperature sensor 55 may be read from this memory. Alternatively, the gains for generating the drive signals for the horizontal and vertical actuators 62, 63 may be controlled according to the ambient temperature.

Although the shake sensor controller 43, the correction gain setter 54, the shake amount detector 51, the coefficient converter 52, the target position setter 53 and the position data input device 57 are described in terms of hardware, they may be constructed by software by a program defining the operation procedures of the respective elements and an MPU (microprocessor unit) for implementing this program.

The shake detector 4 is not limited to one of the image processing type using CCD or the like. The shake may be detected by an angular speed sensor, acceleration sensor, or like sensor.

Although the motors 622, 632 each includes a coreless motor, other motors may be used whose driving performance changes according to the ambient temperature. In such a case, changes of the driving speed, torque and the like may be corrected according to the type of the motor. For example, in the case of stepping motors, an on-off rate (duty ratio) may be changed according to the ambient temperature. Alternatively, an input cycle of the drive signal may be switched or a voltage or current amount may be switched according to the ambient temperature.

Although the driving unit 6 and the position detector 7 adopt an analog serve system, a digital servo system may be adopted.

Further, in this embodiment, the correction is applied to change in the driving performance resulting from temperature variations of both the horizontal and vertical actuators 62, 63 and the moving mechanism for the correction lens unit 3. However, the temperature correction may be applied to either one of them.

The shake corrector is applicable not only to cameras, but also to measuring apparatuses such as calorimeters and radiation thermometers.

As mentioned above, the inventive shake corrector controls the driving of the correction lens in consideration of the ambient temperature. Thus, the shake corrector makes it possible to perform a highly stable drive control independently of a variation in the ambient temperature.

The driving performance of at least one of the driving unit and the shake correction lens moving mechanism is controlled not so as to change according to a temperature variation.

For example, if the driving performance of the shake correction lens moving mechanism does not change according to a temperature variation or is negligible, i.e., only the driving performance of the driving unit changes according to the temperature variation, the shake correction lens moving mechanism is controlled by generating a drive control signal corresponding only to the change in the driving performance according to the temperature variation in spite of a variation in load acting on the driving unit caused by the temperature variation. Accordingly, the drive control can be performed more promptly and more easily.

The degree of the shake of the image to be photographed caused by hand shake can be reliably suppressed. Furthermore, the shake correction lenses can be precisely moved to their target positions.

Further, the correction optical system can be more reliably moved to its target drive position in spite of variations in the ambient temperature by the feedback control using the position detector.

In the case that the temperature correction is required for at least one of the proportional amplification ratio and the differential amplification ratio, the temperature correction is performed at the corresponding correction amplification ratio. Accordingly, the correction optical system can be more stably moved to its target drive position in spite of variations in the ambient temperature.

Furthermore, the basic amplification ratio is corrected so as to compensate for the temperature characteristic of the motor. Accordingly, even if the ambient temperature is different from the reference temperature corresponding to the basic amplification ratio, the torque of the motor is kept at a fixed level. Thus, the correction optical system can be more reliably moved to its target drive position in spite of variations in the ambient temperature.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A shake corrector for use in an optical apparatus provided with a correction lens, comprising:

a temperature detector which detects an ambient temperature; and a controller which controls driving of the correction lens to correct a shake of an optical axis of the optical apparatus with respect to an object, the controller including a drive control circuit which generates a control signal for controlling the driving of the correction lens based on a detected temperature, wherein the optical apparatus further includes:

a moving mechanism which moves the correction lenses, the moving mechanism having a temperature characteristic in an aspect of driving performance; and the drive control circuit generates a control signal in accordance with the temperature characteristic of the moving mechanism.

2. A shake corrector as defined in claim 1, wherein the drive control circuit sets a gain for the control signal based on a detected temperature.

3. A shake corrector as defined in claim 1 is usable in a photographing apparatus having a taking lens.

4. A shake corrector as defined in claim 1, wherein the controller further includes:

a position detector which detects a position of the correction lens; and a feedback signal generator which generates a feedback signal indicative of a difference between a control target position of the correction lens and a detected position of the correction lens.

5. A shake corrector as defined in claim 1, wherein the controller further includes:

a shake detector which detects a shake of an optical axis of an optical apparatus with respect to an object; and a target position setter which sets a target position of the correction lens based on a detected shake.

6. A shake corrector as defined in claim 5, wherein the drive control circuit sets a gain for the control signal based on a difference between a set target position of the correction lens and an instant position of the correction lens.

7. A shake corrector as defined in claim 6, wherein the gain includes a proportional gain and a differential gain.

8. A shake corrector as defined in claim 7, wherein at least one of the proportional gain and the differential gain is set based on a detected temperature.

9. The shake corrector of claim 1, wherein the optical apparatus further includes a driver which provides a driving force to the moving mechanism, the driver having a temperature characteristic in an aspect of driving performance.

10. The shake corrector of claim 9, wherein the drive control circuit generates a control signal in accordance with the temperature characteristic of the driver.

11. A shake corrector as defined in claim 10, wherein the drive control circuit generates a control signal to keep the driving performance of the driver substantially constant independently of a variation in the temperature.

12. A shake corrector as defined in claim 1, wherein the drive control circuit generates a control signal to compensate for a change in the driving performance of the moving mechanism according to a variation in the temperature.

13. A photographing apparatus comprising:
- a taking lens which introduces light from an object to a photosensitive image medium;
- a correction lens which is movable in specified directions;
- a shake detector which detects a shake of an optical axis of the taking lens with respect to the object;
- a basic gain setter which sets a basic gain based on a target position of the correction lens to correct a detected shake and an instant position of the correction lens;
- a temperature detector which detects an ambient temperature of the photographing apparatus;
- a correction gain setter which sets a correction gain to correct a set basic gain based on a detected temperature; and
- a drive controller which controls the drive of the correction lens in accordance with a corrected basic gain.

14. A photographing apparatus as defined in claim 13, wherein the basic gain includes at least one of a proportional gain and a differential gain.

15. A photographing apparatus as defined in claim 14, wherein the correction gain setter sets a correction gain corresponding to a basic gain.

16. A photographing apparatus as defined in claim 13, wherein the drive controller includes a motor which produces a torque of driving the correction lens, the motor having a temperature characteristic in an aspect of driving performance; and the correction gain setter sets a correction gain to compensate for the temperature characteristic of the motor.

17. A method for correcting a shake of an optical apparatus using a correction lens, comprising the steps of:
- detecting a shake of an optical axis of an optical apparatus with respect to an object;
- detecting a temperature of an ambient temperature of the optical apparatus;
- setting a basic gain based on a target position of a correction lens to correct a detected shake and an instant position of the correction lens;
- setting a correction gain to correct a set basic gain based on a detected temperature; and
- driving the correction lens in accordance with a corrected basic gain.

18. A method as defined in claim 17, wherein the basic gain includes at least one of a proportional gain and a differential gain.

19. A method as defined in claim 18, wherein a correction gain is set which corresponds to a basic gain.

20. A method as defined in claim 17, wherein the correction lens is driven by a torque of a motor, the motor having a temperature characteristic in an aspect of driving performance; and a correction gain is set to compensate for the temperature characteristic of the motor.

21. A shake corrector for use in an optical apparatus provided with a correction lens, comprising:
- a temperature detector which detects an ambient temperature;
- said temperature detector having first and second output lines; and
- a controller which controls driving of the correction lens to correct a shake of an optical axis of the optical apparatus with respect to an object, the controller including a control signal generator which generates a control signal of controlling the driving of the correction lens based on a detected temperature, wherein the control signal generator sets a gain for the control signal based on a detected temperature from said first output line, and the control signal generator corrects said gain for the control signal based on a detected temperature from said second output line.

22. A photographing apparatus comprising:
- a taking lens which introduces light from an object to a photosensitive image medium;
- a correction lens which is movable in specified directions;
- a shake detector which detects a shake of an optical axis of the taking lens with respect to the object;
- a temperature detector which detects an ambient temperature of the photographing apparatus;
- a basic gain setter which sets a basic gain based on a target position of the correction lens to correct a detected shake, an instant position of the correction lens, and a detected temperature;
- a correction gain setter which sets a correction gain to correct the set basic gain based on a detected temperature; and
- a drive controller which controls the drive of the correction lens in accordance with a corrected basic gain.

23. A method for correcting a shake of an optical apparatus using a correction lens, comprising the steps of:
- detecting a shake of an optical axis of an optical apparatus with respect to an object;
- detecting a temperature of an ambient temperature of the optical apparatus;
- setting a basic gain based on a target position of a correction lens to correct a detected shake, an instant position of the correction lens, and a detected ambient temperature;
- setting a correction gain to correct a set basic gain based on a detected temperature; and
- driving the correction lens in accordance with a corrected basic gain.

* * * * *